United States Patent
Sawashi et al.

(10) Patent No.: US 8,195,317 B2
(45) Date of Patent: Jun. 5, 2012

(54) DATA REPRODUCTION APPARATUS AND DATA REPRODUCTION METHOD

(75) Inventors: Tokihiko Sawashi, Tokyo (JP); Yasuyuki Kino, Tokyo (JP)

(73) Assignee: Sony Corporation, Tokyo (JP)

( * ) Notice: Subject to any disclaimer, the term of this patent is extended or adjusted under 35 U.S.C. 154(b) by 1135 days.

(21) Appl. No.: 12/038,183

(22) Filed: Feb. 27, 2008

(65) Prior Publication Data

US 2008/0225680 A1 Sep. 18, 2008

(30) Foreign Application Priority Data

Mar. 13, 2007 (JP) ................. 2007-064077

(51) Int. Cl.
- *G06F 17/00* (2006.01)
- *H04R 29/00* (2006.01)
- *G10L 19/00* (2006.01)
- *G11B 20/10* (2006.01)

(52) U.S. Cl. .......... 700/94; 381/56; 704/501; 369/47.16

(58) Field of Classification Search .................... 700/94; 381/1, 56, 94.1–94.4, 94.8; 704/500–504; 369/47.16

See application file for complete search history.

(56) References Cited

U.S. PATENT DOCUMENTS

| | | | |
|---|---|---|---|
| 5,828,755 A | 10/1998 | Feremans et al. | |
| 6,865,430 B1 | 3/2005 | Runton et al. | |
| 2003/0044024 A1 | 3/2003 | Aarts et al. | |
| 2004/0008615 A1* | 1/2004 | Oh | 370/203 |
| 2008/0170711 A1* | 7/2008 | Breebaart et al. | 381/77 |

FOREIGN PATENT DOCUMENTS

| | | | |
|---|---|---|---|
| EP | 0644542 | * | 3/1995 |
| JP | 8-2119 | | 1/1996 |
| JP | 9-55634 | | 2/1997 |
| JP | 3432517 | | 5/2003 |
| JP | 2005-501278 | | 1/2005 |
| JP | 2005-210509 | | 8/2005 |

* cited by examiner

*Primary Examiner* — Jesse Elbin
(74) *Attorney, Agent, or Firm* — Oblon, Spivak, McClelland, Maier & Neustadt, L.L.P.

(57) ABSTRACT

A data reproduction apparatus includes: arithmetic means for calculating difference data that indicate a difference between left-channel and right-channel data that have been compressed in a predetermined compression format; higher harmonic component generation means for generating a higher harmonic component, which was lost during compression, by performing, when the difference data's signal level exceeds a predetermined threshold, a digital limiter process that suppresses the signal level to the threshold; and adding means for adding the higher harmonic component to the left-channel and right-channel data to reproduce original data before being compressed.

9 Claims, 9 Drawing Sheets

| BIT RATE (kbps) | UPPER LIMIT OF REPRODUCTION FREQUENCY RANGE (Hz) |
|---|---|
| 64 | ABOUT 8k |
| 96 | 11k~12k |
| 128 | ABOUT 16k |
| 256 | ABOUT 20k |
| 320 | ABOUT 20k |

FIG. 1

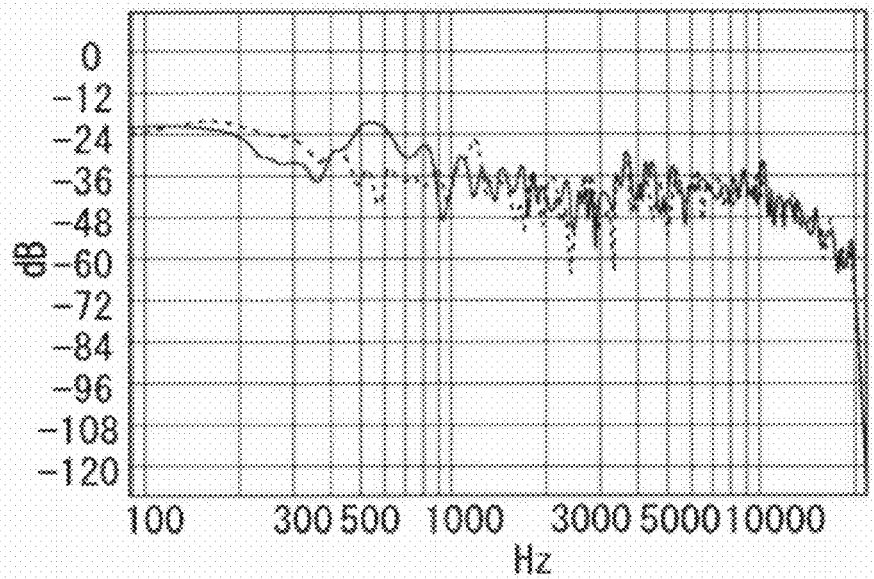
FIG. 2A REPRODUCTION SPECTRUM FOR CDDA
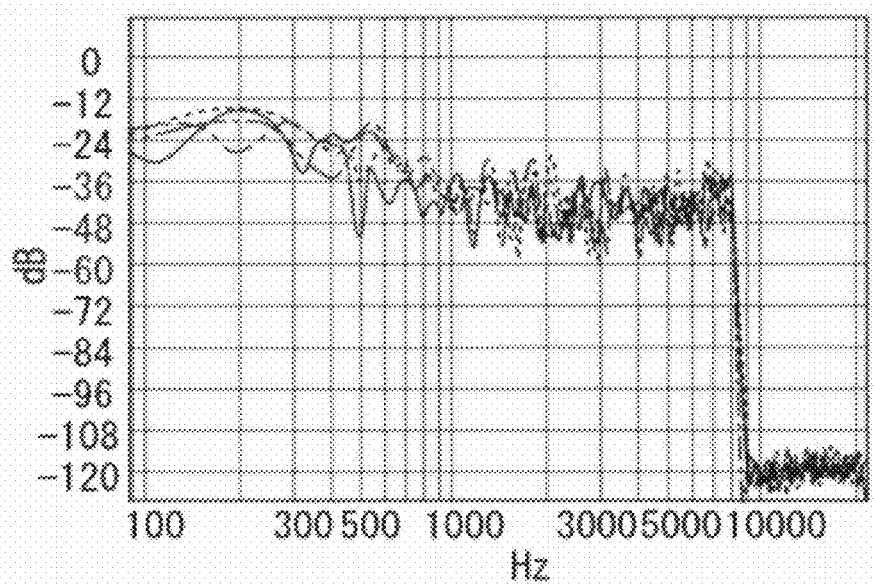
FIG. 2B REPRODUCTION SPECTRUM FOR DATA COMPRESSED IN 64KBPS SINE WAVE OF 1kHz COMBINATION OF
TWO WAVES
1kHz+(1/3)kHz COMBINATION OF
THREE WAVES
1kHz+(1/3)kHz+(1/5)5kHz

ADDED TO INFINITY

T1

| BIT RATE (kbps) | UPPER LIMIT OF REPRODUCTION FREQUENCY RANGE (Hz) |
|---|---|
| 64 | ABOUT 8k |
| 96 | 11k~12k |
| 128 | ABOUT 16k |
| 256 | ABOUT 20k |
| 320 | ABOUT 20k |
| CD (UNCOMPRESSED) | ABOUT 22.05 |

FIG. 9

DATA REPRODUCTION APPARATUS AND DATA REPRODUCTION METHOD

CROSS REFERENCES TO RELATED APPLICATIONS

The present invention contains subject matter related to Japanese Patent Application JP2007-064077 filed in the Japanese Patent Office on Mar. 13, 2007, the entire contents of which being incorporated herein by reference.

BACKGROUND OF THE INVENTION

1. Field of the Invention

The present invention relates to a data reproduction apparatus and data reproduction method, and is preferably applied for reproducing high frequency components, which were lost after original music data, a source of Compact Disc Digital Audio (CDDA) data, was compressed in a digital compression format such as MPEG-1 Audio Layer 3 (MP3) format, for example.

2. Description of the Related Art

There is an audio signal reproduction apparatus that performs a so-called oversampling process, in which a sampling frequency for Pulse Code Modulation (PCM) digital audio signals read from a storage medium is multiplied by n (n: an integer greater than or equal to 2) to interpolate new sampling points, to produce higher harmonic components that the original signal components do not have. The audio signal reproduction apparatus then superimposes the higher harmonic components, whose bandwidth is greater than or equal to the audible bandwidth, on the original signal components in order to reproduce more natural sound (see Patent Document 1: Jpn. Pat. No. 3140273, for example).

In addition, there is an acoustic reproduction apparatus that clips a waveform of the original signal components by using a nonlinear circuit including a silicon diode to produce higher harmonic components, whose bandwidth is greater than or equal to the audible bandwidth. The acoustic reproduction apparatus then adds the higher harmonic components to the original signal components to reproduce sound, whose quality is close to natural sound spectrum (see Patent Document 2: Jpn. Pat. Laid-open Publication No. H8-2119, for example).

By the way, MP3 players have become popular for listening to music. MP3 players reproduce music data, which have been compressed in a digital compression format, such as MP3: the format is used to compress original music data like CDDA.

The higher the compression rate, the more music data a storage medium, such as a hard disk or a flash memory, can store. That is why a user wants a higher compression rate. However, the higher the compression rate, the more original signal components may be lost.

As shown in FIG. 1, as the compression rate increases (i.e. the bit rate decreases), the upper limit of a reproduction frequency range becomes lower. Accordingly, the original signals' high frequency components are gone. This is explained in FIGS. 2A and 2B: It is evident from FIG. 2A, which illustrates a reproduction spectrum for CDDA music data, that output signal components are covering the entire bandwidth up to 22.05 kHz, which is a half of a sampling frequency Fs (44.1 kHz); and it is also evident from FIG. 2B, which illustrates a reproduction spectrum for CDDA music data compressed in a bit rate of 64 Kbps, that output signal components are not covering high frequency components greater than about 8 kHz.

In that manner, by increasing the compression rate, music data is reduced in size, allowing a storage medium to store more music data. On the other hand, the higher the compression rate, the more high frequency components (which are greater than or equal to a predetermined frequency bandwidth) are lost, decreasing sound quality compared to the original uncompressed music data.

SUMMARY OF THE INVENTION

By the way, the audio signal reproduction apparatus (disclosed in the Patent Document 1) and the acoustic reproduction apparatus (disclosed in the Patent Document 2) are designed to produce high frequency components greater than or equal to the audible bandwidth, which original signal components do not have, and superimpose them on the original signal components. Accordingly, they are completely different from the one that is designed to reproduce high frequency components, which have been lost when original music data, a source of CDDA data, were compressed in a digital compression format such as MP3. In addition, the above audio signal reproduction apparatus and the above acoustic reproduction apparatus have some problems: Their processing load rises due to oversampling; and their circuit configuration becomes large because a new nonlinear circuit is added.

The present invention has been made in view of the above points and is intended to provide a data reproduction apparatus and data reproduction method that can provide high-quality reproduction sound by reproducing high frequency components, which were lost when data were compressed, while their processing load is maintained at low and their circuit configuration is simple.

In one aspect of the present invention, a data reproduction apparatus includes: arithmetic means for calculating difference data that indicate a difference between left-channel and right-channel data that have been compressed in a predetermined compression format; higher harmonic component generation means for generating a higher harmonic component, which was lost during compression, by performing, when the difference data's signal level exceeds a predetermined threshold, a digital limiter process that suppresses the signal level to the threshold; and adding means for adding the higher harmonic component to the left-channel and right-channel data to reproduce original data before being compressed. In this manner, the apparatus removes the common data components from the left-channel and right-channel data, only leaving unique components in each channel. The high frequency components, which were lost during compression, are generated from the remaining data components by the digital limiter process. As a result, the original data, including the lost high frequency components, are easily reproduced by adding the generated high frequency components to the left-channel and right-channel data.

In that manner, the apparatus removes the common data components from the left-channel and right-channel data, only leaving unique components in each channel. The high frequency components, which were lost during compression, are generated from the remaining data components by the digital limiter process. As a result, the original data, including the lost high frequency components, are easily reproduced by adding the generated high frequency components to the left-channel and right-channel data. That realizes a data reproduction apparatus and data reproduction method that can provide high-quality reproduction sound by reproducing high frequency components, which were lost when data were compressed, while their processing load is maintained at low and their circuit configuration is simple.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 is a table illustrating a reproduction frequency range when CDDA data are compressed in MP3;

FIGS. 2A and 2B are schematic diagrams illustrating a reproduction spectrum before and after compression;

FIG. 9 is a schematic diagram illustrating a table that lists bit rates and corresponding upper limits of reproduction frequency range.

DETAILED DESCRIPTION OF PREFERRED EMBODIMENTS

An embodiment of the present invention will be described in detail with reference to the accompanying drawings.

(1) Overall Configuration of Vehicle Audio Apparatus

Figure 3:
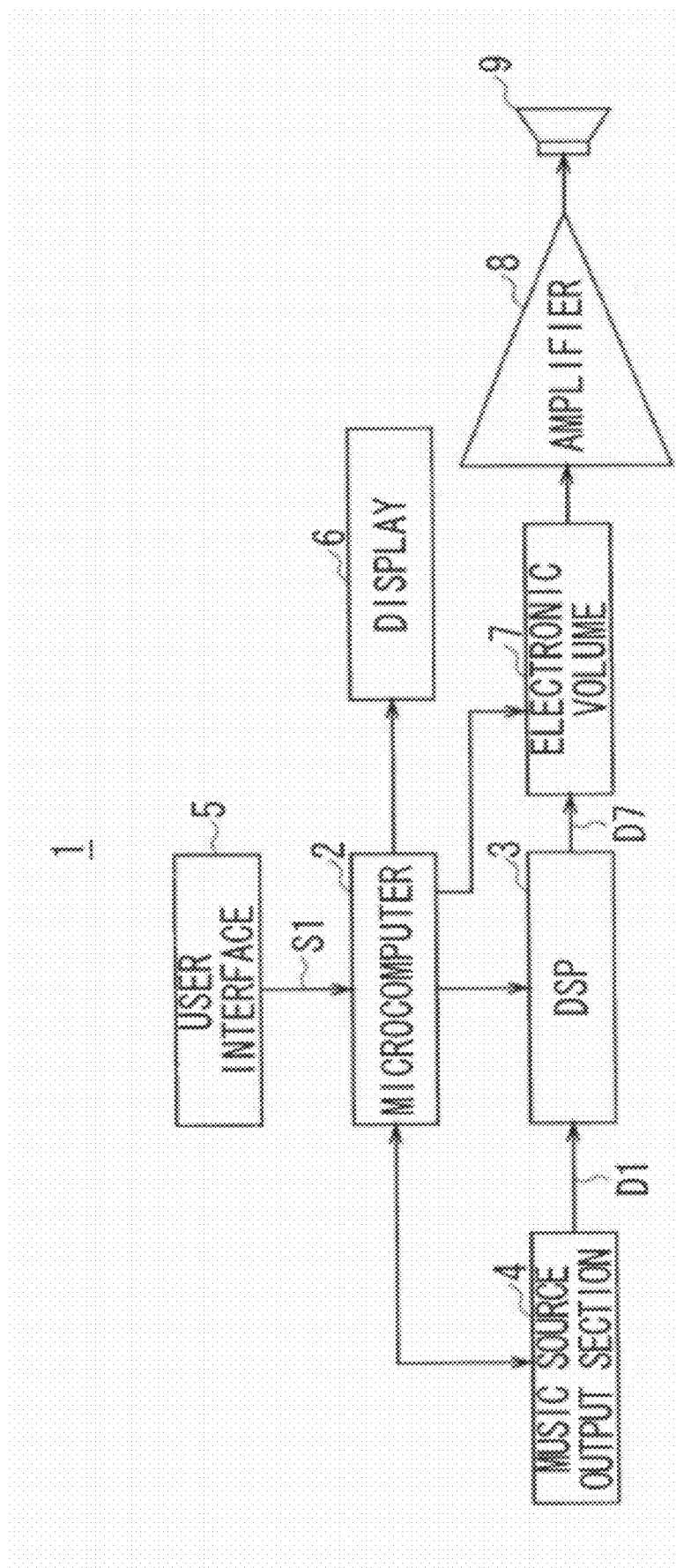
FIG. 3 is a schematic block diagram illustrating the overall configuration of a vehicle audio apparatus.

In FIG. 3, the reference numeral 1 denotes a vehicle audio apparatus according to an embodiment of the present invention. When accepting a music source selection signal S1 selected by a user from a user interface 5, a microcomputer (which is a Central Processing Unit [CPU]) 2 controls a music source output section 4 to read out digitally-compressed music data D1 from a disc storage medium (such as CD-R [Compact Disc-Recordable] or DVD-R [Digital Versatile Disc-Recordable]), a flash memory or a hard disk, or acquire digitally-compressed music data D1 from a digital television broadcasting channel. The microcomputer 2 subsequently supplies the digitally-compressed music data D1 to a Digital Signal Processor (DSP) 3.

The DSP 3 performs, in accordance with a data reproduction program, a reproduction process (described later) to the music data D1 in order to reproduce high frequency components, which were lost when data were being compressed. The DSP 3 then produces high-quality original music data D7 by adding the high frequency components to the music data D1. The DSP 3 subsequently adjusts the music data D7 at a predetermined signal level via an electronic volume 7 and an amplifier 8. The DSP 3 then outputs high-quality reproduced sound from a speaker 9.

By the way, the microcomputer 2 is designed to display on display 6, like a spectrum analyzer, the signal levels of reproduced sound, which is output from the speaker 9. The microcomputer 2 is also designed to display music titles, artist names, playback-elapsed time and the like.

(2) Higher Harmonic Component Generation Process by DSP

Figure 4:
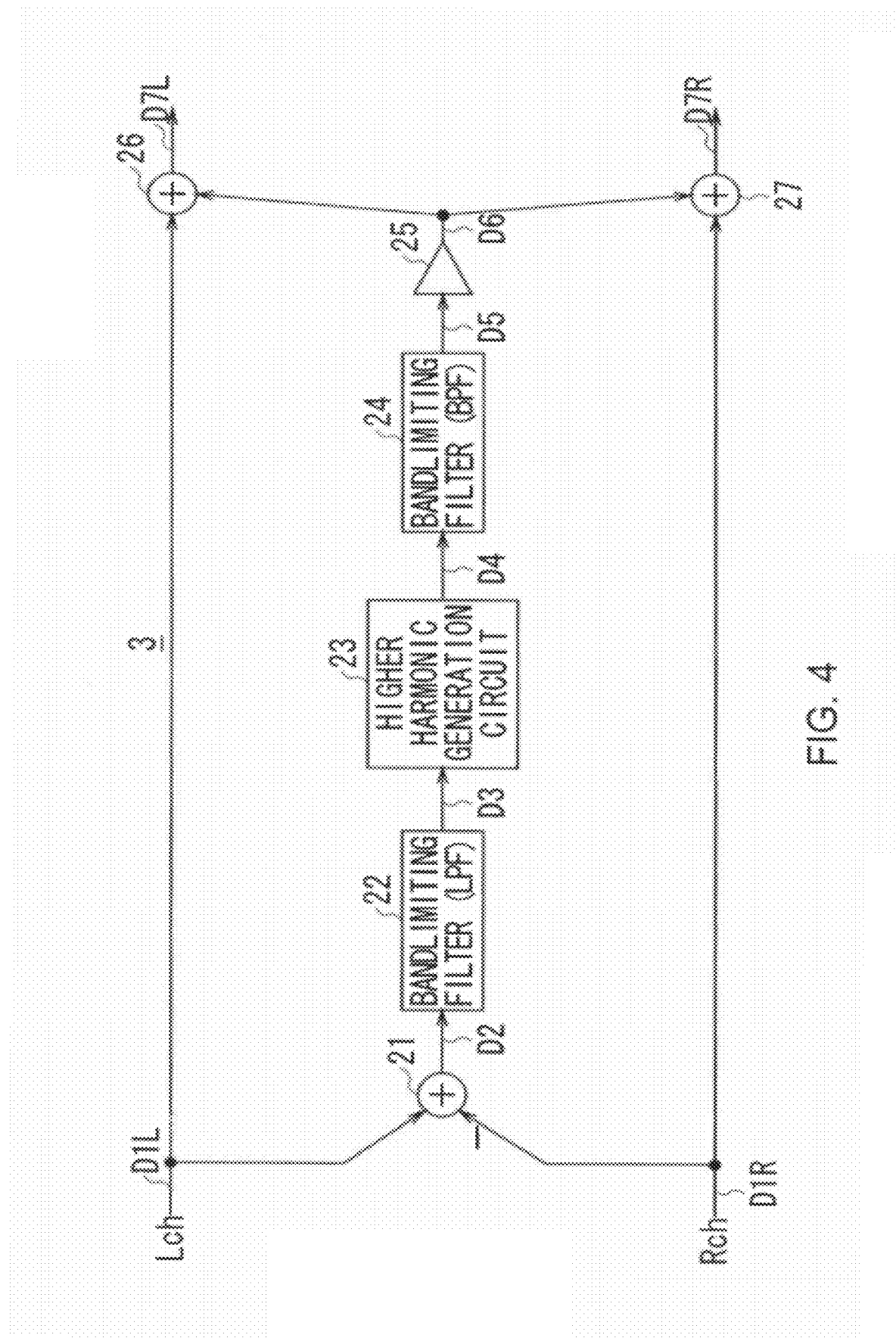
FIG. 4 is a schematic diagram illustrating a higher harmonic generation processing block in a DSP.

As shown in FIG. 4, the DSP 3 transmits compressed L-channel music data D1L and compressed R-channel music data D1R, which were supplied from the music source output section 4, to an arithmetic circuit 21. The DSP 3 also transmits the compressed L-channel music data D1L and the compressed R-channel music data D1R to a first accumulator 26 and a second accumulator 27, respectively.

The arithmetic circuit 21 calculates a difference between the L-channel music data D1L and the R-channel music data D1R, and transmits the calculated difference data D2 to a bandlimiting filter 22. The music data D1L and D1R are considered to have lost high frequency components greater than or equal to a certain frequency bandwidth when they were compressed, but the lost high frequency components mainly consists of musical instruments' components rather than vocal components.

For example, it is known that a piano outputs a fundamental tone of up to about 4 kHz while musical instruments, like cymbal, output frequency components of about 10 kHz and more. On the other hand, human voice (i.e. vocal components), even if soprano voice, consists of frequency components less than about 2 kHz, which are lower than musical instruments' components. Accordingly, the high frequency components (including higher harmonic components) that might be lost during data compression (i.e. the frequency components of more than about 8 kHz when the bit rate is 64 Kbps) mainly consist of musical instruments' sound rather than human voice.

Moreover, the vocal components are usually recorded such that their sound images will be located at a midpoint between stereo speakers or between a front left speaker and a front right speaker). This means that both the L channel and the R channel include the similar signal components, which are substantially the same as monaural signals.

Accordingly, the difference between the L-channel music data D1L and the R-channel music data D1R calculated by the arithmetic circuit 21 do not include the vocal components the L-channel and R-channel data had, but mainly include musical instruments' components (whose images won't be located at the midpoint), which are extracted as difference data D2.

The subsequent processing blocks in the DSP 3 performs a higher harmonic component generation process in which the difference data D2 (which mainly consists of musical instruments' components) are processed. In this manner, the difference data D2 are processed to generate higher harmonic components. This method can reduce the amount of data processed and the processing load more than the one that processes the L-channel music data D1L and the R-channel music data separately to generate higher harmonic components.

The bandlimiting filter 22, for example, is a lowpass filter whose cut-off frequency is about 10 kHz. The bandlimiting filter 22 cuts off frequency components of more than about 10 kHz from the difference data D2 and transmits resulting difference data D3 to a higher harmonic generation circuit 23.

The reason that the frequency components of more than about 10 kHz have been removed by the bandlimiting filter 22 is that it is not intended to generate higher harmonic components greater than the frequency range of the original music data (greater than about 20 kHz, in this case) or the CDDA music data before being compressed.

Actually, the sampling frequency of CDDA is 44.1 kHz. Therefore, the frequency range is half of it or 22.05 kHz, according to the sampling theorem. However, in this case, the frequency range is set at 20 kHz while the cut-off frequency of the bandlimiting filter 22 is about 10 kHz.

The higher harmonic generation circuit 23 performs a higher harmonic generation process in which the difference data D3 supplied from the bandlimiting filter 22 are processed.

Figure 5:
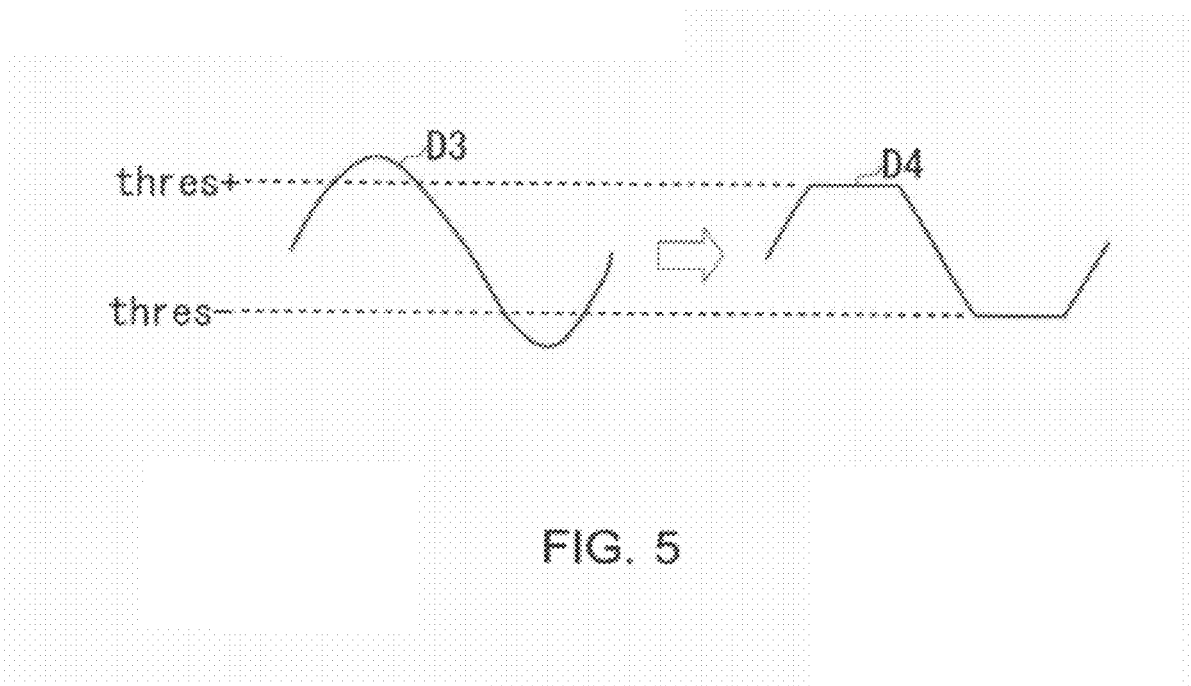
FIG. 5 is a schematic diagram illustrating a digital limiter process.

Specifically, as shown in FIG. 5, if the signal level of the difference data D3 exceeds predetermined thresholds (Thres, −Thres), the higher harmonic generation circuit 23 forcibly suppresses the signal level to the thresholds (Thres, −Thres). This process (a so-called digital limiter process) generates square wave data D4, which are then supplied to a bandlimiting filter 24.

The digital limiter process of the higher harmonic generation circuit 23 can be written in C or the like:

```
Output = Input;
If (Input > Thres)
    Output = Thres;
If (Input < −Thres)
    Output = −Thres;
``` wherein "Input" is the difference data D3 to be input, "Output" is the square wave data D4 to be output, and "Thres" and "−Thres" are thresholds.

The square wave data D4 output from the higher harmonic generation circuit 23 are typically expressed as follows:

$$\text{Square Wave} = \sin \omega t + \tfrac{1}{3}\sin 3\omega t + \tfrac{1}{5}\sin 5\omega t + \tfrac{1}{7}\sin 7\omega t$$

$$= \Sigma 1/(2n+1)\sin(2n+1)\omega t \ (n=0\sim\infty) \quad (1)$$

Figure 6A:
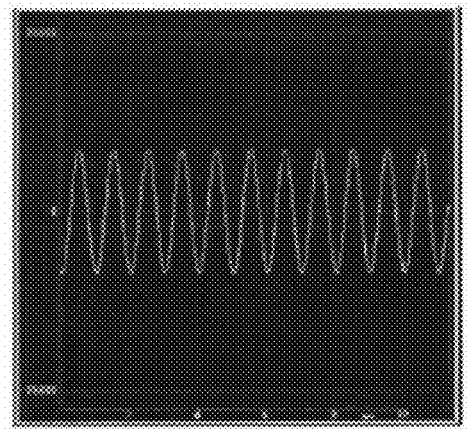
FIGS. 6A to 6D are schematic diagrams illustrating a process of generating a square wave.
Figure 6B:
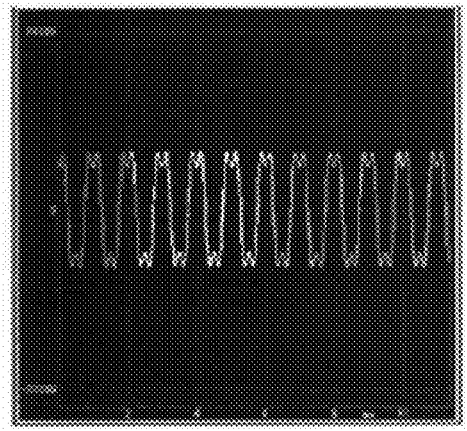
Figure 6C:
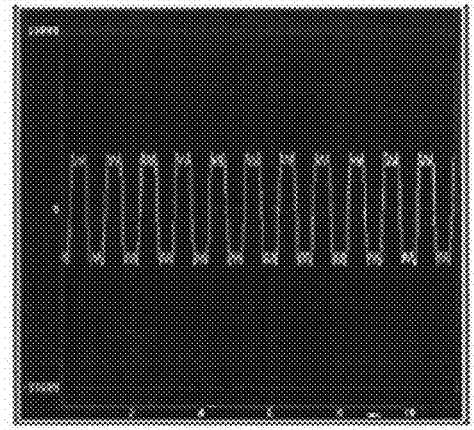

In this manner, the square wave data D4 is a basic frequency (n=1) to which a frequency component whose frequency is an odd-number multiple of the basic frequency is added. In fact, as shown in FIGS. 6A to 6D, odd-number-order high frequencies can be observed: FIG. 6B shows the result of combining two waves, or a 1 kHz sine wave (FIG. 6A) and a (⅓)3 kHz higher harmonic components; and FIG. 6C shows the result of combining three waves, or a 1 kHz sine wave (FIG. 6A), a (⅓)3 kHz higher harmonic components and a (⅕)5 kHz higher harmonic components.

Figure 6D:
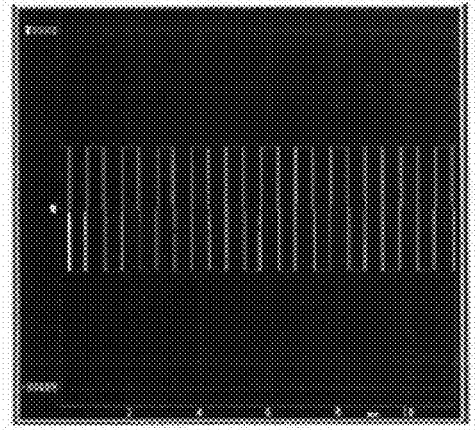
Figure 7:
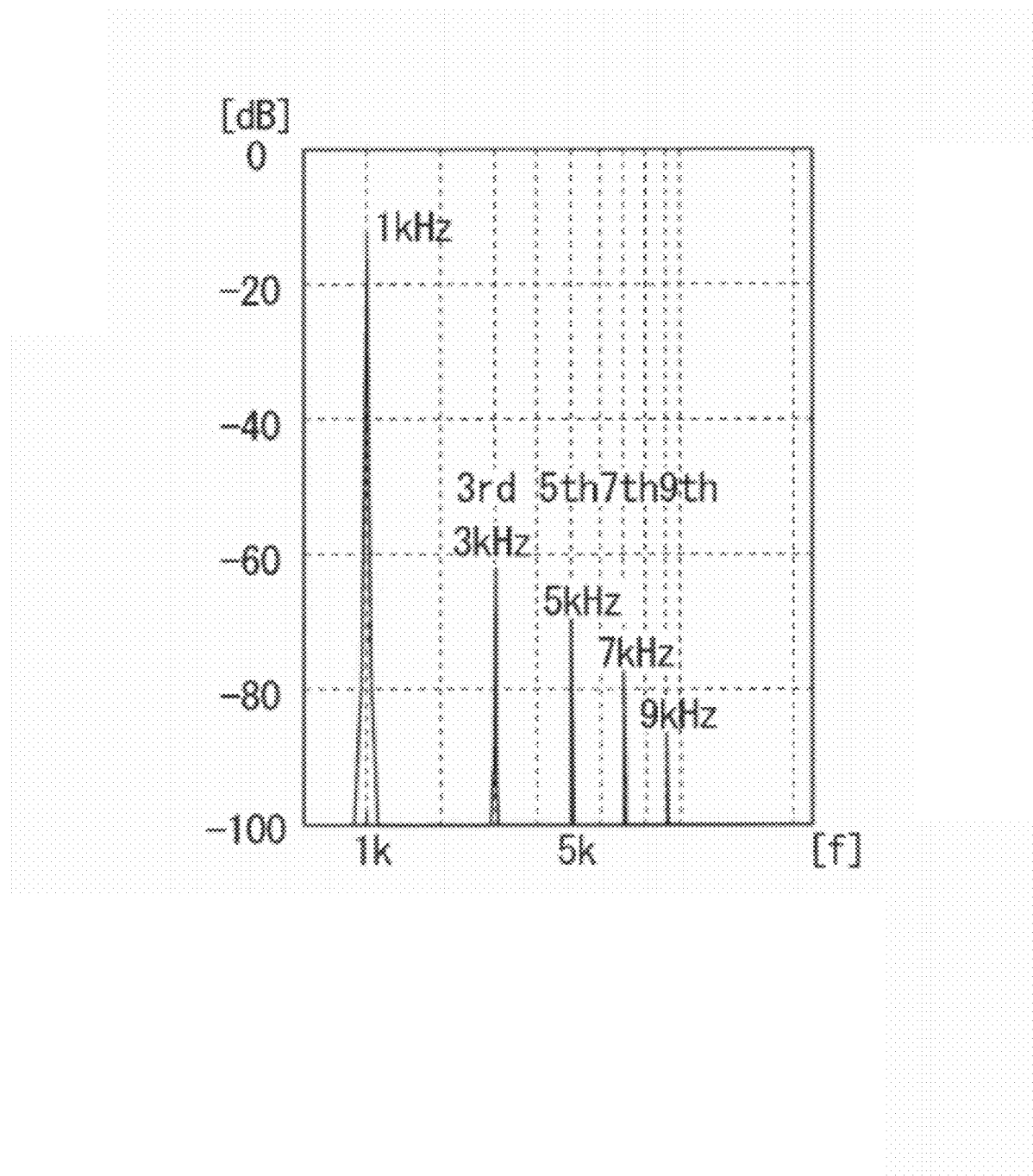
FIG. 7 is a schematic diagram illustrating an odd-number-order higher harmonic component.

FIG. 6D shows the final result of combining odd-number-order higher harmonic components up to infinity (∞), which is the square wave data D4. It is evident from FIG. 7 that there are a 1 kHz basic frequency and a plurality of other odd-number-order high frequency components.

That is, the square wave data D4 includes odd-number-order higher harmonic components. However, the following components should be removed: the basic frequency component; and the higher harmonic components whose frequencies are greater than the upper limit of the range of frequencies that are to be added to the L-channel music data D1L and the R-channel music data D1R.

The bandlimiting filter 24 includes a bandpass filter that removes from the square wave data D4 the basic frequency component and the higher harmonic components whose frequencies are greater than the upper limit of the range of frequencies that are to be added to the L-channel music data D1L and the R-channel music data D1R. This extracts frequency components more than or equal to about 8 kHz and less than or equal to 22.05 kHz (which is ½ of the sampling frequency fs): The frequency components of more than or equal to about 8 kHz were lost during data compression while 22.05 kHz is the reproduction frequency range of CDDA music data. The bandlimiting filter 24 then transmits resultant higher harmonic components data D5 to a gain control circuit 25.

The gain control circuit 25 adjusts the gain of the higher harmonic component data D5 and then supplies resultant higher harmonic component data D6 to the first accumulator 26 and the second accumulator 27.

The first accumulator 26 adds the L-channel music data D1L with the higher harmonic component data D6. This produces L-channel music data D7L, which are the equivalent of music data that have not yet undergone data compression and still include high frequency components.

The second accumulator 27 adds the R-channel music data D1R with the higher harmonic component data D6. This produces R-channel music data D7R, which are the equivalent of music data that have not yet undergone data compression and still include high frequency components.

Accordingly, the DSP 3 supplies to the electronic volume 7 the L-channel and R-channel music data D7L and D7R as high-quality original music data D7, which are considered to be the equivalent of music data that have not yet undergone data compression and still include high frequency components.

(3) Higher Harmonic Component Automatic Generation Process Depending on Bit Rate The following describes a higher harmonic component automatic generation process in which the vehicle audio apparatus 1 automatically generates proper higher harmonic component data D6 in accordance with the bit rate of the music data D1 output from the music source output section 4.

Figure 8:
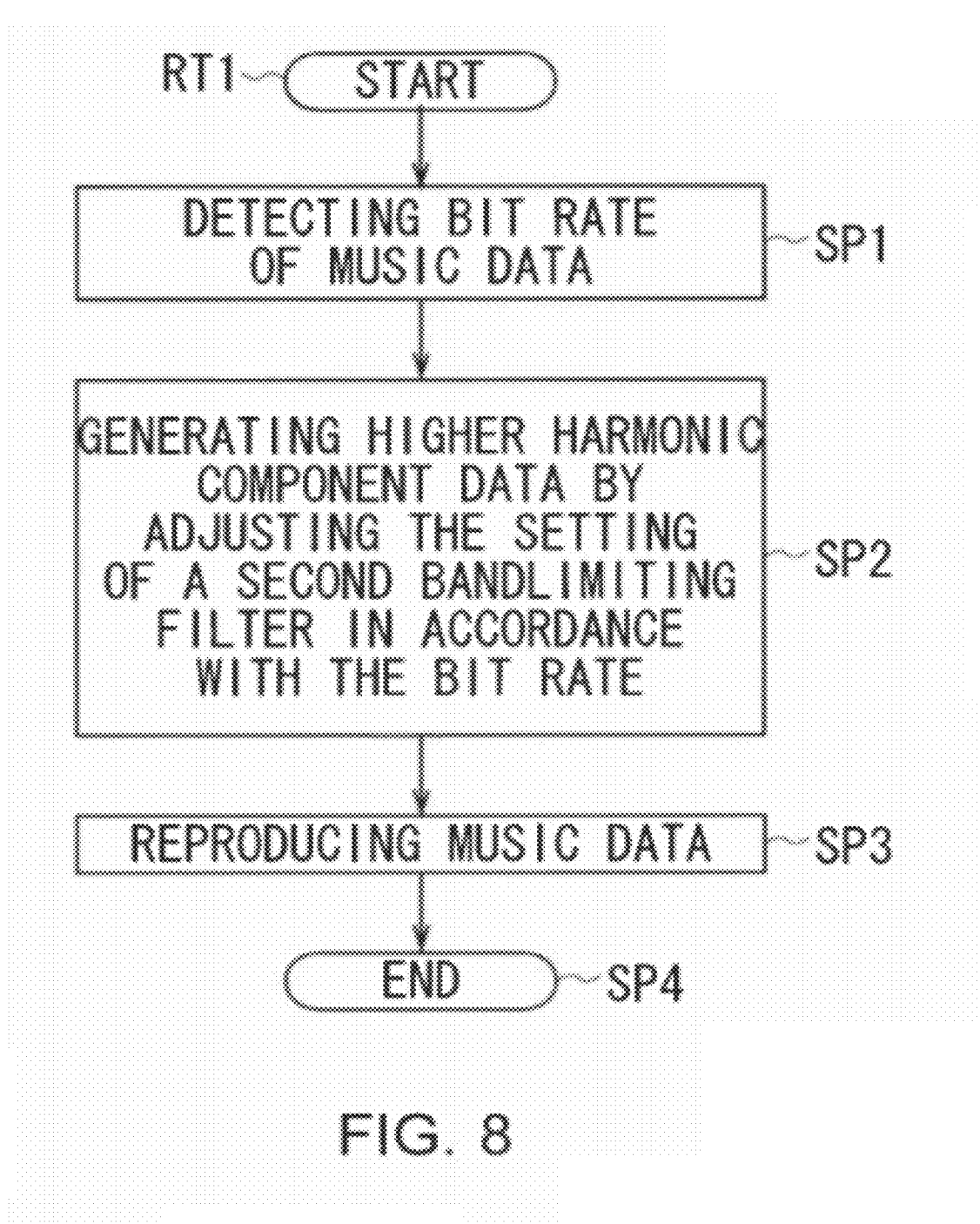
FIG. 8 is a flowchart illustrating a procedure of higher harmonic component automatic generation process.

The microcomputer 2 of the vehicle audio apparatus 1 starts a predetermined higher harmonic component automatic generation program. In FIG. 8, the microcomputer 2 proceeds to step SP1 via a start step of a routine RT1.

At step SP1, the microcomputer 2 detects the bit rate of the music data D1 that the music source output section 4 has supplied to the DSP 3, and then proceeds to step SP2. The microcomputer 2 detects the bit rate by, for example, reading information attached to the music data D1 or information acquired from the Internet.

At step SP2, the microcomputer 2 that has a table T1 (FIG. 9) listing bit rates and corresponding upper limits of reproduction frequency range sets the lower-side cut-off frequency of the bandlimiting filter 24: If it has detected the bit rate of 64 Kbps at step SP1, it sets the cut-off frequency that extracts the high frequency components of more than about 8 kHz; if it has detected the bit rate of 96 Kbps, it sets the cut-off frequency that extracts the high frequency components of more than about 12 kHz; if it has detected the bit rate of 128 Kbps, it sets the cut-off frequency that extracts the high frequency components of more than about 16 kHz; if it has detected the bit rate of 256 Kbps, it sets the cut-off frequency that extracts the high frequency components of more than about 20 kHz; and if it has detected the bit rate of 320 Kbps, it sets the cut-off frequency that extracts the high frequency components of more than about 20 kHz. In this manner, the microcomputer 2 generates the proper higher harmonic component data D5 based on the bit rate, and then proceeds to next step SP3.

By the way, if the microcomputer 2 at step SP2 recognizes from the bit rate detected at step SP1 that the music data D1 are uncompressed original data such as CDDA, then it determines from the table T1 that the upper limit of reproduction frequency range of the music data D1 is the same as that reproduction frequency range, or 22.05 kHz, and that it does not have to perform the higher harmonic generation process. In this case, the microcomputer 2 does not perform the higher harmonic generation process of the DSP 3 and the gain adjustment process of the amplifier 8.

At step SP3, the microcomputer 2 reproduces the music data D7, which are the equivalent of music data that have not yet undergone data compression, by adding the higher harmonic component data D5 generated at step SP2 to the L-channel music data D1L and the R-channel music data D1R. The microcomputer 2 then supplies the music data D7 via the electronic volume 7 and the amplifier 8 to the speaker 9, which then outputs high-quality reproduced sound. The microcomputer 2 subsequently proceeds to step SP4 to end the process.

(4) Operation and Effect

As described above, the microcomputer 2 of the vehicle audio apparatus 1 calculates the difference data D2 that indicate a difference between the L-channel music data D1L and the R-channel music data D1R in order to only remove the vocal components. This decreases the amount of data. The DSP 3 then performs a digital limiter process for the remaining frequency components, which mainly consist of musical instruments' sound, to generate the higher harmonic components, which are considered to have been lost during data compression. This reduces the processing load by half for generating higher harmonic components, compared to a typical one that processes stereo channels separately.

In addition, the DSP 3 only performs a simple signal process, such as the above formula (1), to generate the square wave data D4 including odd-number-order higher harmonic waves. The bandlimiting filter 24 extracts from the square wave data D4 the higher harmonic component data D5, which are then added to the L-channel music data D1L and the R-channel music data D1R. This simple process reproduces the L-channel and R-channel music data D7L and D7R, which are considered to be the equivalent of music data that have not yet undergone data compression and still include high frequency components.

That prevents increase of the processing load (which might have occurred due to oversampling) and increase of the size of circuit configuration (which might have happened when a new nonlinear circuit was installed) while easily reproducing the original music data D7 including higher frequency components, which the uncompressed data have, by the digital limiter process of the DSP 3.

Moreover, the microcomputer 2 of the vehicle audio apparatus 1 is designed to detect the bit rate of the music data D1 supplied to the DSP 3 and then generates, in accordance with the detected bit rate, the proper higher harmonic component data D5, thereby making it easy-to-use and offering high-quality reproduced sound (which are considered to be the equivalent of the original music data that have not yet undergone data compression) to a user.

In that manner, the microcomputer 2 of the vehicle audio apparatus 1 can reproduce higher frequency components, which were lost during data compression, from the music data D1 in an easier, simpler way, providing high-quality sound to a user.

(5) Other Embodiments

In the above-noted embodiment, high frequency components are reproduced on the premise that the original music data D1, whose sound source is a CDDA in which the sampling frequency fs is set at 44.1 kHz, have been compressed in a compression format such as MP3. However, the present invention is not limited to this. The sampling frequency fs and the compression format may vary: For example, the apparatus may also deal with music data compressed in other formats, whose sound source is a DVD audio in which the sampling frequency fs is set at 192 kHz.

Moreover, in the above-noted embodiment, the cut-off frequency of the bandlimiting filter 24 changes according to the bit rates listed in the table T1, which lists the bit rates of 64, 96, 128, 256 and 320 Kbps. However, the present invention is not limited to this. The table T1 may list other bit rates.

Furthermore, in the above-noted embodiment, the DSP 3, as a data reproduction apparatus, is installed in the vehicle audio apparatus 1. However, the present invention is not limited to this. The DSP 3 may be installed in other electronic devices such as a portable digital audio player, a cell phone that can play music, a home-use audio apparatus, Personal Digital Assistant (PDA) and a personal computer.

Furthermore, in the above-noted embodiment, the DSP 3 executes the preinstalled data reproduction program to generate high frequency components, which were lost during data compression. However, the present invention is not limited to this. The data reproduction program may be installed from a storage medium or downloaded from the Internet.

Furthermore, in the above-noted embodiment, the microcomputer 2 executes the preinstalled higher harmonic component automatic generation program to perform the routine RT1 or the higher harmonic component automatic generation process. However, the present invention is not limited to this. The higher harmonic component automatic generation program may be installed from a storage medium or downloaded from the Internet.

Furthermore, in the above-noted embodiment, the DSP 3, or the data reproduction apparatus, includes: the arithmetic circuit 21, which is arithmetic means; the higher harmonic generation circuit 23 and the bandlimiting filter 24, which are higher harmonic component generation means; and the first and second accumulators 26 and 27, which are adding means. However, the present invention is not limited to this. The data reproduction apparatus may be configured in a different manner such that it includes the arithmetic means, the higher harmonic component generation means and the adding means.

The data reproduction apparatus, the data reproduction method and the data reproduction program can be applied for reproducing high frequency components, which were lost when original music data were compressed in a data compression format, such as MP3, AAC (Advanced Audio Coding), WMA (Windows (Registered Trademark) Media Audio), ATRAC (Adaptive Transform Acoustic Coding).

It should be understood by those skilled in the art that various modifications, combinations, sub-combinations and alterations may occur depending on design requirements and other factors insofar as they are within the scope of the appended claims or the equivalents thereof.

What is claimed is:

1. A data reproduction apparatus comprising:
    arithmetic means for calculating difference data that indicate a difference between left-channel and right-channel data that have been compressed in a predetermined compression format;
    higher harmonic component generation means for generating a higher harmonic component, which was lost during compression, by performing, when the difference data's signal level exceeds a predetermined threshold, a digital limiter process that suppresses the signal level to the threshold; and
    adding means for adding the higher harmonic component to the left-channel and right-channel data to reproduce original data before being compressed.

2. The data reproduction apparatus according to claim 1, wherein the higher harmonic component generation means generates square wave data by performing the digital limiter process and then produces the higher harmonic component from the square wave data.

3. The data reproduction apparatus according to claim 1, further comprising first filtering means for limiting, before generating the higher harmonic component, the bandwidth of the difference data by using a lowpass filter whose cut-off frequency is set at a predetermined level in order not to generate the higher harmonic component of more than the reproduction frequency range of the original data by the higher harmonic component generation means.

4. The data reproduction apparatus according to claim 1, further comprising second filtering means for removing a signal component of unnecessary frequency range from the higher harmonic component before adding the higher harmonic component to the left-channel and right-channel data.

5. A data reproduction method comprising:
- a difference calculation step of calculating, by using arithmetic means, difference data that indicate a difference between left-channel and right-channel data that have been compressed in a predetermined compression format;
- a higher harmonic component generation step of checking if the signal level of the difference data exceeds a predetermined threshold, and generating a higher harmonic component, which was lost during compression, by performing a digital limiter process of higher harmonic generation means that suppresses the signal level to the threshold when the signal level exceeds the threshold; and
- a reproduction step of adding, by using predetermined adding means, the higher harmonic component to the left-channel and right-channel data to reproduce original data before being compressed.

6. The data reproduction method according to claim 5, wherein the higher harmonic component generation step generates square wave data by performing the digital limiter process and then produces the higher harmonic component from the square wave data.

7. The data reproduction method according to claim 5, further comprising a first filtering step of limiting, before generating the higher harmonic component, the bandwidth of the difference data by using a lowpass filter whose cut-off frequency is set at a predetermined level in order not to generate the higher harmonic component of more than the reproduction frequency range of the original data by the higher harmonic component generation step.

8. The data reproduction method according to claim 5, further comprising a second filtering step of removing a signal component of unnecessary frequency range from the higher harmonic component before adding the higher harmonic component to the left-channel and right-channel data.

9. A data reproduction apparatus comprising:
- an arithmetic section that calculates difference data that indicate a difference between left-channel and right-channel data that have been compressed in a predetermined compression format;
- a higher harmonic component generation section, including a processor, that generates a higher harmonic component, which was lost during compression, by performing, when the difference data's signal level exceeds a predetermined threshold, a digital limiter process that suppresses the signal level to the threshold; and
- an adding section that adds the higher harmonic component to the left-channel and right-channel data to reproduce original data before being compressed.

* * * * *